(12) United States Patent
Hirata

(10) Patent No.: US 10,773,599 B2
(45) Date of Patent: Sep. 15, 2020

(54) DRIVE SOURCE CONTROL DEVICE, AND VEHICLE EQUIPPED WITH SAID DRIVE SOURCE CONTROL DEVICE

(71) Applicant: NTN CORPORATION, Osaka (JP)

(72) Inventor: Junichi Hirata, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/375,472

(22) Filed: Apr. 4, 2019

(65) Prior Publication Data

US 2019/0225094 A1    Jul. 25, 2019

Related U.S. Application Data

(63) Continuation of application No. PCT/JP2017/036475, filed on Oct. 6, 2017.

(30) Foreign Application Priority Data

Oct. 12, 2016 (JP) ................. 2016-201078

(51) Int. Cl.
*B60L 15/20* (2006.01)
*F16H 48/36* (2012.01)
*B60L 9/18* (2006.01)

(52) U.S. Cl.
CPC .......... *B60L 15/2036* (2013.01); *B60L 15/20* (2013.01); *B60L 15/2009* (2013.01);
(Continued)

(58) Field of Classification Search
CPC .......... B60L 2240/42; B60L 2240/421; B60W 10/08
(Continued)

(56) References Cited

U.S. PATENT DOCUMENTS 5,345,155 A * 9/1994 Masaki ............... B60L 15/2036
                                                318/400.07
5,373,219 A * 12/1994 Grabowski ............ B60K 6/46
                                                318/139
(Continued)

FOREIGN PATENT DOCUMENTS

EP    2 149 474 A1    2/2010
JP    8-163702        6/1996
(Continued)

OTHER PUBLICATIONS

Japanese Decision of Grant in corresponding Japanese Application No. 2016-201078.
(Continued)

*Primary Examiner* — Jeffrey J Restifo

(57) ABSTRACT

Provided is a drive source control device that can suppress increase in the rotation speed of a drive source. This drive source control device (67) includes: an overspeed determination module (68) to determine whether the rotation speed of each of two drive sources (2L, 2R) is overspeed; and a correction module (69) to, when the overspeed determination module (68) determines that the rotation speed of at least one of the drive sources is overspeed, correct command values for outputs of the two drive sources, supplied from a command module (66a). The correction module (69) corrects the command values of the outputs of the two drive sources (2L, 2R) so that the torque of the drive wheel having greater rotation speed decreases from the torque before the correction, and the torque of the drive wheel having smaller rotation speed maintains or decreases from the torque before the correction.

4 Claims, 11 Drawing Sheets

(52) U.S. Cl.
CPC .............. *F16H 48/36* (2013.01); *B60L 9/18* (2013.01); *B60L 2240/421* (2013.01); *B60L 2240/461* (2013.01); *Y02T 10/7241* (2013.01); *Y02T 10/7275* (2013.01)

(58) Field of Classification Search
USPC .................................................... 180/65.285
See application file for complete search history.

(56) References Cited

U.S. PATENT DOCUMENTS

| | | | | |
|---|---|---|---|---|
| 5,432,413 | A * | 7/1995 | Duke .................. | B60K 6/46 318/139 |
| 5,757,161 | A * | 5/1998 | Ikkai .................. | B60L 3/00 180/171 |
| 6,617,703 | B2 * | 9/2003 | Matsubara ............ | B60K 6/485 290/400 |
| 6,862,511 | B1 * | 3/2005 | Phillips ................ | B60K 5/08 701/54 |
| 6,907,337 | B2 * | 6/2005 | Phillips ................ | B60K 6/44 701/51 |
| 6,908,411 | B2 * | 6/2005 | Shimizu ............... | B60K 6/44 477/5 |
| 6,915,198 | B2 * | 7/2005 | Phillips ................ | B60K 6/44 701/54 |
| 7,599,786 | B2 * | 10/2009 | Utsumi ................. | B60K 6/445 701/112 |
| 7,794,356 | B2 * | 9/2010 | Muta .................... | B60K 6/445 477/3 |
| 7,908,067 | B2 * | 3/2011 | Soliman ............... | B60W 30/19 701/54 |
| 8,157,035 | B2 * | 4/2012 | Whitney ............... | B60K 6/365 180/65.265 |
| 8,177,007 | B2 | 5/2012 | Abe et al. | |
| 8,225,893 | B2 * | 7/2012 | Yamada ................ | B60K 6/445 180/65.285 |
| 8,281,885 | B2 * | 10/2012 | Zettel ................... | B60K 6/445 180/65.285 |
| 8,527,125 | B2 * | 9/2013 | Tate ..................... | B60L 7/24 701/22 |
| 8,534,399 | B2 * | 9/2013 | Soliman ............... | B60K 6/48 180/65.21 |
| 8,596,390 | B2 * | 12/2013 | Soliman ............... | B60W 20/13 180/65.21 |
| 8,639,402 | B2 * | 1/2014 | Tate ..................... | B60L 50/61 701/22 |
| 8,761,982 | B2 * | 6/2014 | Yamamoto ............ | B60K 6/52 701/22 |
| 9,016,410 | B2 * | 4/2015 | Trowell ................ | B60L 3/102 180/6.5 |
| 9,114,725 | B2 | 8/2015 | Noguchi | |
| 2009/0038866 | A1 * | 2/2009 | Abe ..................... | B60K 1/02 180/65.7 |
| 2013/0261864 | A1 * | 10/2013 | Noguchi ............... | B60L 15/20 701/22 |

FOREIGN PATENT DOCUMENTS

| | | |
|---|---|---|
| JP | 2006-256454 | 9/2006 |
| JP | 2008-295173 | 12/2008 |
| JP | 4907390 | 1/2012 |
| JP | 2013-213518 | 10/2013 |
| JP | 2015-21594 | 2/2015 |

OTHER PUBLICATIONS

International Search Report dated Dec. 26, 2017 in corresponding International Application No. PCT/JP2017/036475.
English Translation by WIPO of the International Preliminary Report on Patentability dated Apr. 25, 2019 in corresponding International Patent Application No. PCT/JP2017/036475 (6 pages).
Extended European Search Report, dated May 12, 2020, in corresponding European Application No. 17859488.3 (7 pp.).

* cited by examiner $\alpha = 2 \quad \beta = 10$

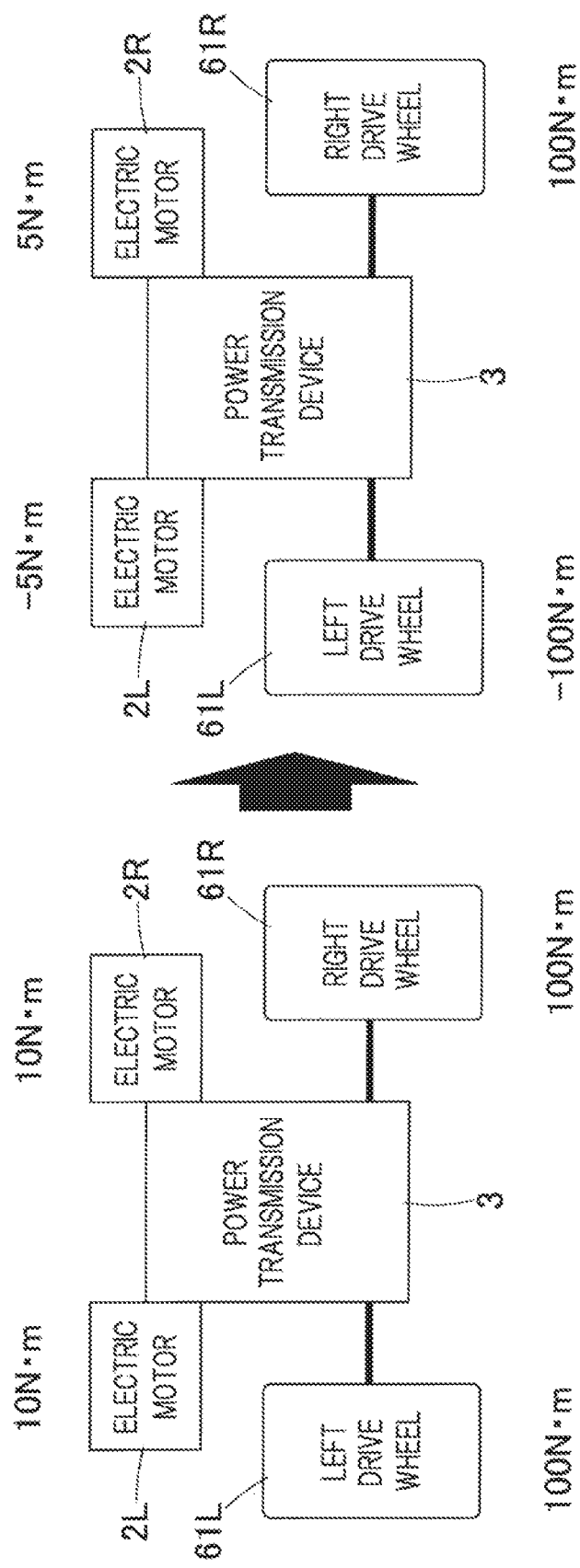

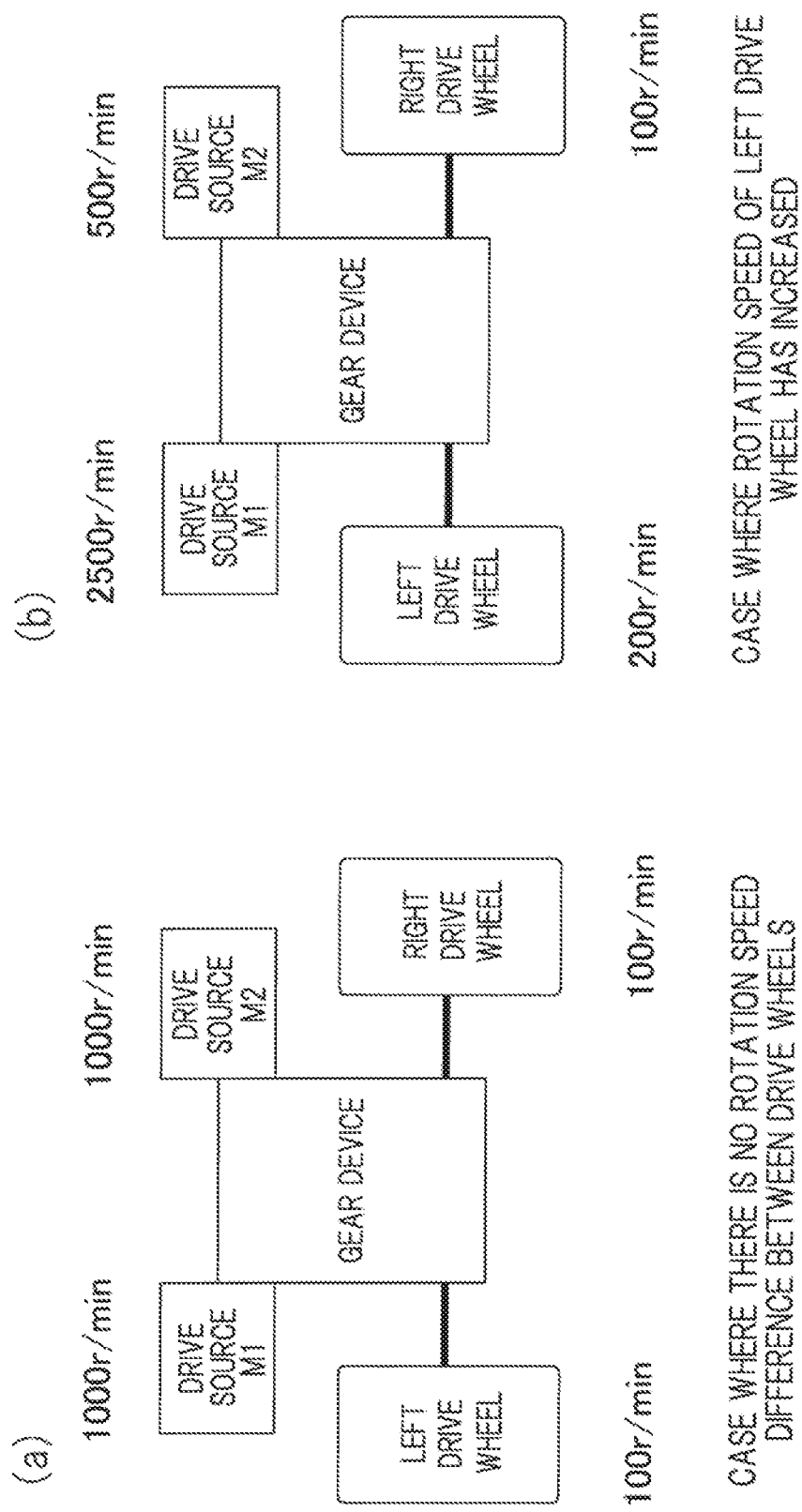

Fig. 11        $\alpha = 2 \quad \beta = 10$
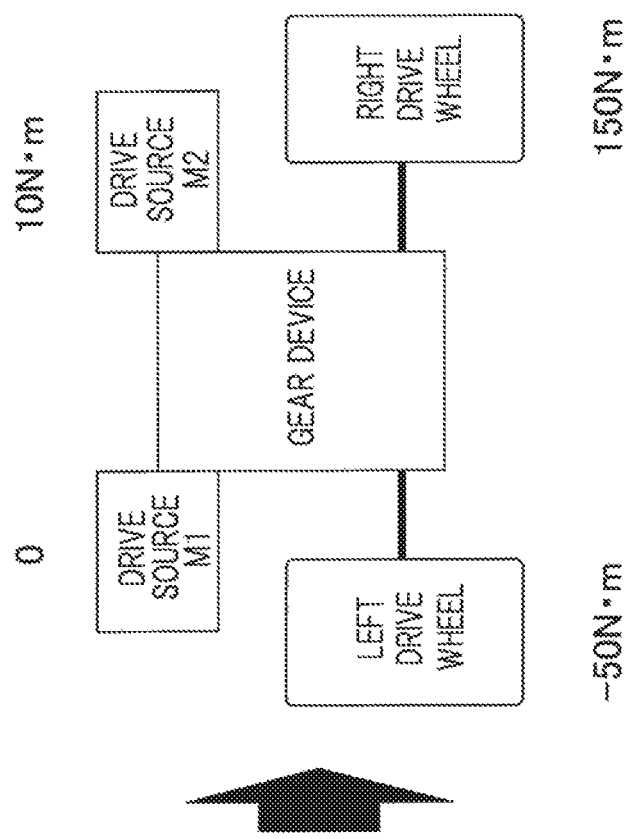
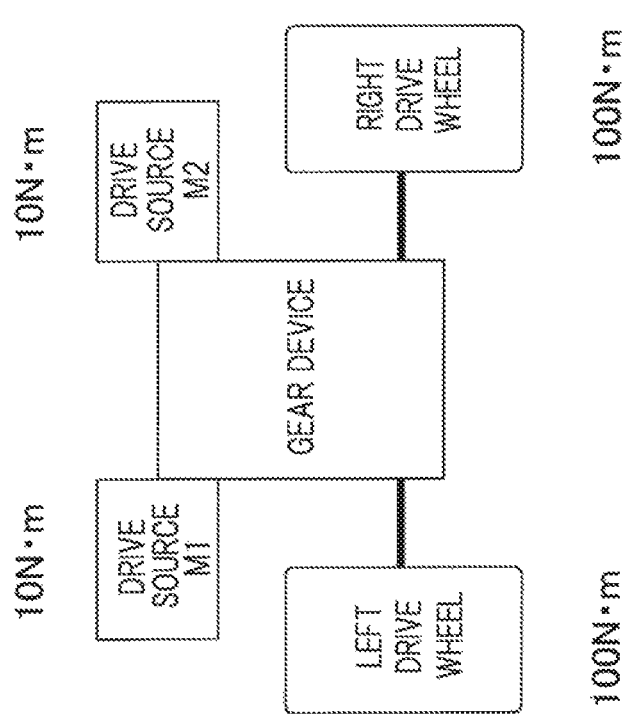

DRIVE SOURCE CONTROL DEVICE, AND VEHICLE EQUIPPED WITH SAID DRIVE SOURCE CONTROL DEVICE

CROSS REFERENCE TO THE RELATED APPLICATION

This application is a continuation application, under 35 U.S.C. § 111(a), of international application No. PCT/JP2017/036475, filed Oct. 6, 2017, which claims Convention priority to Japanese patent application No. 2016-201078, filed Oct. 12, 2016, the entire disclosure of which is herein incorporated by reference as a part of this application.

BACKGROUND OF THE INVENTION

Field of the Invention

The present invention relates to: a drive source control device for transmitting driving torques generated from two independent drive sources, to left and right drive wheels, with a torque difference therebetween amplified; and a vehicle equipped with the drive source control device.

Description of Related Art

In order to achieve smooth turning traveling of a vehicle or suppress change in the behavior of a vehicle such as extreme understeer or extreme oversteer, it may be effective to generate a great driving torque difference between left and right drive wheels. A vehicle driving device is thus disclosed in which a gear device having two planetary gear mechanisms combined is provided between two drive sources and left and right drive wheels so as to amplify the torque difference (Patent Documents 1 and 2).

In these vehicle driving devices, output torques of the two drive sources are determined and controlled on the basis of torque command values for the left and right drive wheels issued from a high-order ECU. The patent documents disclose electric motors as the drive sources.

In the vehicle driving devices, while a difference between torques of the two drive sources is amplified, a difference in rotation speed is reduced in transmission to the left and right drive wheels. Where the torque amplification factor is defined as $\alpha$ ($\alpha>1$), the reduction ratio is defined as $\beta$ ($\beta\geq 1$), torques of the two drive sources corresponding to the respectively left and right drive wheels are defined as $TM1$, $TM2$, and torques of the left and right drive wheels are defined as $TWL$, $TWR$, the torque relationship can be represented by the following expressions.

$$TWL+TWR=\beta(TM1+TM2) \quad (1)$$

$$TWL-TWR=\alpha\beta(TM1-TM2) \quad (2)$$

Similarly, where the rotation speeds of the two drive sources corresponding to the respective left and right drive wheels are defined as $\omega M1$, $\omega M2$ and the rotation speeds of the left and right drive wheels are defined as $\omega WL$, $\omega MR$, the rotation speed relationship can be represented by the following expressions.

$$\omega WL+\omega WR=(\omega M1+\omega M2)/\beta \quad (3)$$

$$\omega WL-\omega WR=(\omega M1-M2)/\alpha\beta \quad (4)$$

As a method for coping with the case where the electric motor reaches overspeed, a motor control method for detecting overspeed of a motor of an electric vehicle and preventing damage to the motor is disclosed (Patent Document 3).

RELATED DOCUMENT

[Patent Document]
  [Patent Document 1] JP Laid-open Patent Publication No. 2015-21594
  [Patent Document 2] JP Patent No. 4907390
  [Patent Document 3] JP Laid-open Patent Publication No. H08-163702

SUMMARY OF THE INVENTION

In the vehicle driving device shown in Patent Documents 1 and 2, from expressions (3) and (4), the rotation speeds $\omega M1$, $\omega M2$ of the two drive sources are calculated as follows.

$$\omega M1=\beta(1+\alpha)/2*\omega WL+\beta(1-\alpha)/2*\omega WR \quad (5)$$

$$\omega M2=\beta(1-\alpha)/2*\omega WL+\beta(1+\alpha)/2*\omega WR \quad (6)$$

In addition, from expressions (1) and (2), the torques $TWL$, $TWR$ of the left and right drive wheels are calculated as follows.

$$TWL=\beta(1+\alpha)/2*TM1+\beta(1-\alpha)/2*TM2 \quad (7)$$

$$TWR=\beta(1-\alpha)/2*TM1+\beta(1+\alpha)/2*TM2 \quad (8)$$

In the case of $\alpha>1$ and $\beta\geq 1$, the signs of the coefficients are as follows.

$$\beta(1+\alpha)/2>0, \beta(1-\alpha)/2<0$$

In a vehicle on which the vehicle driving device is mounted, it is assumed that only the left drive wheel spins while driving torques are applied to the left and right drive wheels ($TWL>0$, $TWR>0$). Since $TWL>0$ and $TWR>0$ are satisfied, $TM1>0$ and $TM2>0$ are satisfied according to expressions (1) and (2). Under this condition, when the rotation speed $\omega WL$ of the left drive wheel increases, the rotation speed $\omega M1$ of one drive source, i.e., the drive source corresponding to the left drive wheel, greatly increases, and the rotation speed $\omega M2$ of the other drive source, i.e., the drive source corresponding to the right drive wheel decreases, according to expressions (5) and (6).

FIG. 10 shows one example. In the case where the left and right drive wheels rotate at 100 r/min (revolutions per minute), if $\alpha=2$ and $\beta=10$ are satisfied, the rotation speeds of the drive source M1 corresponding to the left drive wheel and the drive source M2 corresponding to the right drive wheel are 1000 r/min, as shown in diagram (a) of FIG. 10. Here, if the rotation speed of the left drive wheel increases to 200 r/min, the rotation speed of the drive source M1 increases to 2500 r/min and the rotation speed of the drive source M2 decreases to 500 r/min, as shown in diagram (b) of FIG. 10.

Next, the following case will be discussed: it is assumed that the rotation speed of the drive source M1 exceeds a permissible rotation speed and reaches overspeed, and the motor control method disclosed in Patent Document 3 is used to set the torque of the drive source M1 to zero or cause a braking torque. That is, the torque $TM1$ of the drive source M1 is set as $TM1\leq 0$. In the case where $TM1\leq 0$ is set and the torque $TM2$ of the drive source M2 that has not reached overspeed is maintained, the torque $TWL$ of the left drive wheel decreases but the torque $TWR$ of the right drive wheel increases, according to expressions (7) and (8).

FIG. 11 shows one example. As shown in diagram (a) of FIG. 11, in the case where the drive source M1 and the drive source M2 are outputting torques of 10 N·m, if $\alpha=2$ and $\beta=10$ are satisfied, the torques of the left and right drive wheels are 100 N·m. Here, as shown in diagram (b) of FIG. 11, if the torque of the drive source M1 is adjusted to zero and the torque of the drive source M2 is maintained at 10 N·m, the torque of the left drive wheel becomes −50 N·m and the torque of the right drive wheel becomes 150 N·m, and thus the torque of the right drive wheel increases.

In the above situation, as an example, the case where the vehicle is turning left while accelerating will be considered. In left turning, the left drive wheel is the turning inner wheel, and therefore, if the turning lateral acceleration is great, the left drive wheel spins, so that the drive source M1 reaches overspeed. Under this condition, changing the torque TM1 of the drive source M1 from TM1>0 to TM1≤0 and maintaining the torque of the drive source M2 causes the torque TWL of the left drive wheel to decrease or become a braking torque, resulting in reducing the rotation speeds of the left drive wheel and the drive source M1.

However, as a result of increase in the torque TWR of the right drive wheel, a yaw moment that promotes turning is generated and thus the vehicle might exhibit a spin behavior. In addition, if the turning is so steep that the turning inner wheel spins, a tire load on the right drive wheel which is the turning outer wheel is also great. Therefore, the tire may spin due to the increase in the driving torque, which causes the tire gripping to be lost. In this case, the vehicle attitude might become further unstable.

Similarly, in the case of starting to move or accelerating on a split low-μ road surface, the above situation might occur. In the case where the right drive wheel is on an asphalt road surface and the left drive wheel is on a frozen road surface, the left drive wheel is likely to spin at the time of starting to move or accelerating, and as in the above case, when the drive source M1 has reached overspeed, if the torque TM1 of the drive source M1 is set to zero or in a regeneration direction, the torque of the right drive wheel which is on the asphalt road increases, so that the vehicle turns leftward. As a result, the vehicle attitude might become unstable.

An object of the present invention is to provide: a drive source control device that can suppress increase in the rotation speed of a drive source and suppress occurrence of an unnecessary yaw moment to stabilize the vehicle attitude; and a vehicle equipped with the drive source control device.

In the following description, the reference characters in the embodiments are used for convenience sake in order to facilitate the understanding.

A drive source control device 67 according to the present invention is a drive source control device for controlling two drive sources 2L, 2R of a vehicle, the vehicle including the two drive sources 2L, 2R, left and right drive wheels 61L, 61R, and a power transmission device 3 disposed among the two drive sources 2L, 2R and the left and right drive wheels 61L, 61R, the power transmission device 3 being configured to distribute powers from the two drive sources 2L, 2R to the left and right drive wheels 61L, 61R while amplifying a difference between the torques from the two respective drive sources 2L, 2R, so as to drive the left and right drive wheels 61L, 61R, the drive source control device including: an overspeed determination module 68 configured to determine whether or not a rotation speed of each of the two drive sources 2L, 2R is overspeed; and a correction module 69 configured to, when the overspeed determination module 68 determines that the rotation speed of at least one 2L (2R) of the two drive sources 2L, 2R is overspeed, correct command values for outputs of the two drive sources 2L, 2R, the command values being supplied from a command module 66a, the correction module 69 correcting the command values for the outputs of the two respective drive sources 2L, 2R so that a torque of the drive wheel 61L (61R) that has the greater rotation speed, of the left and right drive wheels 61L, 61R, decreases from the torque before the correction, and a torque of the drive wheel 61R (61L) that has the smaller rotation speed maintains or decreases from the torque before the correction.

Regarding the determination for whether or not the rotation speed of each drive source 2L (2R) is overspeed, for example, the rotation speed may be determined to be overspeed when the rotation speed of the drive source 2L (2R) is greater than a threshold value. Alternatively, the rotation speeds of the drive sources 2L, 2R may be calculated by applying the rotation speeds of the drive wheels 61L, 61R to the relational expressions between the rotation speeds of the left and right drive wheels 61L, 61R and the rotation speeds of the drive sources 2L, 2R, and when at least one of the calculated rotation speeds of the drive sources 2L, 2R is greater than a threshold value, the rotation speed may be determined to be overspeed.

Further alternatively, without using the relational expressions, the overspeed determination module 68 may determine whether or not the drive source 2L, 2R has reached overspeed, when the rotation speeds of the left and right drive wheels 61L, 61R satisfy a predetermined condition.

The threshold value is any threshold value that is determined depending on designing or the like, and is, for example, determined by figuring out an appropriate threshold value through examination and/or simulation.

In the above configuration, the overspeed determination module 68 determines whether or not the rotation speed of each of the drive sources 2L, 2R is overspeed. When the overspeed determination module 68 determines that the rotation speed of at least one drive source 2L (2R) is overspeed, the correction module 69 corrects the command values for outputs of the two drive sources 2L, 2R, the command values being supplied from the command module 66a.

That is, the correction module 69 corrects the command values for outputs of the two drive sources 2L, 2R so that the torque of the drive wheel 61L (61R) that has the greater rotation speed, of the left and right drive wheels 61L, 61R, decreases from the torque before the correction, and the torque of the drive wheel 61R (61L) that has the smaller rotation speed maintains or decreases from the torque before the correction. The amount of the correction is determined through examination and/or simulation, for example. Correcting the command values for the outputs of the two drive sources 2L, 2R as described above enables the drive wheel 61L (61R) that has the greater rotation speed to decelerate by being subjected to mechanical resistance from the road surface and the driving part. As a result, overspeed of the drive source 2L (2R) is suppressed. In addition to this, occurrence of an unnecessary yaw moment due to torque increase is suppressed in the corresponding drive wheel 61L (61R), whereby the vehicle attitude can be stabilized.

The correction module 69 may correct the command values for the outputs of the two drive sources 2L, 2R so that the torque of the drive wheel 61L (61R) that has the greater rotation speed, of the left and right drive wheels 61L, 61R, becomes a braking torque, and the torque of the drive wheel 61R (61L) that has the smaller rotation speed maintains or decreases from the torque before the correction. In this case, a braking torque occurs in the drive wheel 61L (61R) that has the greater rotation speed, in response to the drive source 2L (2R), in addition to mechanical resistance from the road surface and the driving part. Therefore, it is possible to suppress overspeed of the drive source 2L (2R) more effectively.

The power transmission device 3 may include a torque difference amplification device 30. The torque difference amplification device 30 may have two planetary gear mechanisms 30L, 30R and amplify a difference between torques generated by the two drive sources 2L, 2R. In this case, it is possible to achieve smooth turning traveling of the vehicle by the torque difference amplification device 30 amplifying the difference between torques generated by the two drive sources 2L, 2R.

A vehicle according to the present invention is the vehicle including the drive source control device 67. In this case, for example, on a split low-μ road surface or the like, increase in the rotation speed of the drive source 2L (2R) in which overspeed has occurred is suppressed, and occurrence of an unnecessary yaw moment is suppressed, whereby the vehicle attitude can be stabilized.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 9 is a diagram showing another example of torque command values corrected by the drive source control device shown in FIG. 1;

FIG. 10 is a diagram showing an example of drive wheel rotation speeds and drive source rotation speeds in a conventional vehicle driving device; and FIG. 11 is a diagram showing an example of drive wheel torques and drive source torques before and after correction in the conventional vehicle driving device.

DESCRIPTION OF EMBODIMENTS

Figure 1:
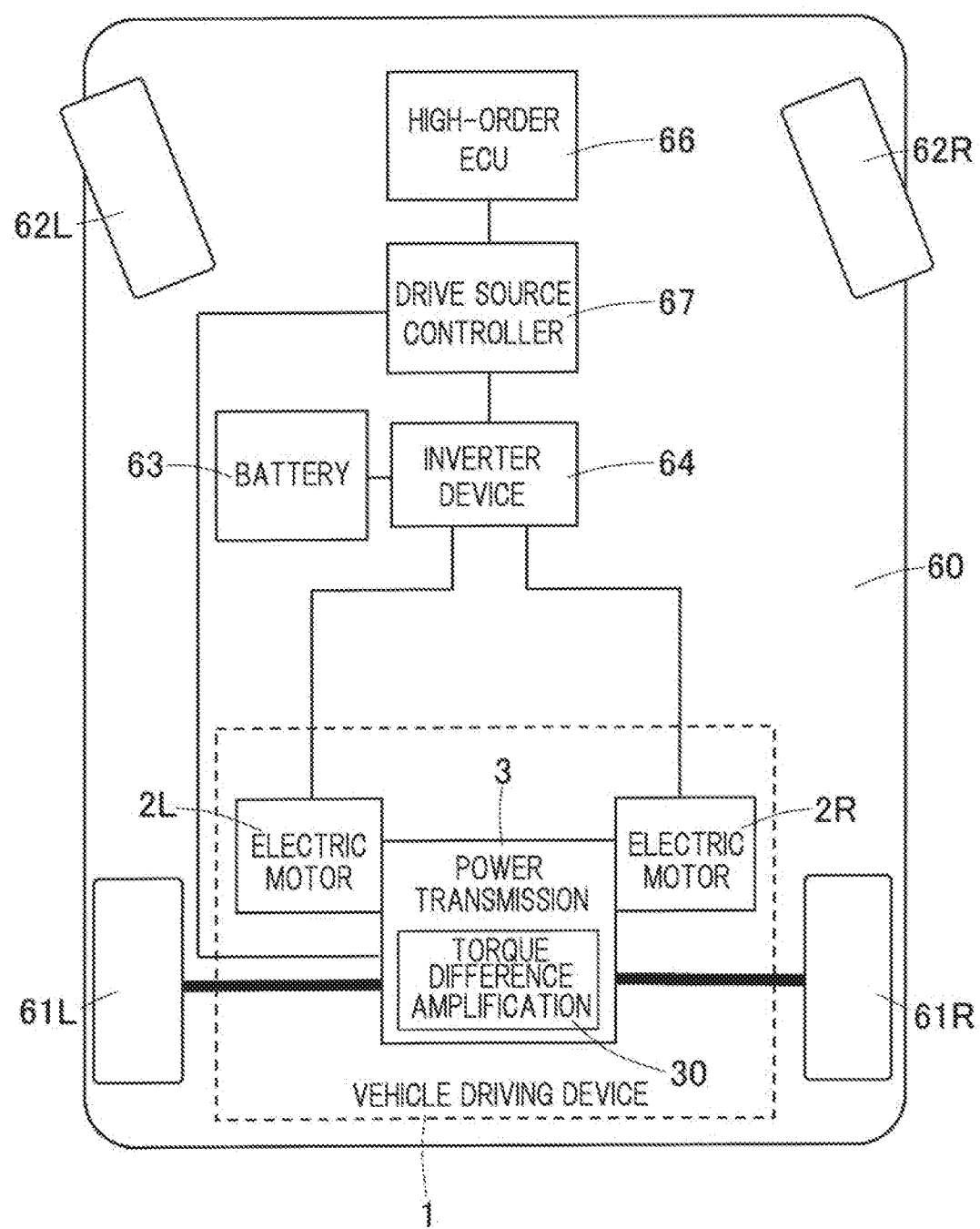
FIG. 1 is a block diagram showing the conceptual configuration of a vehicle provided with a drive source control device according to the first embodiment of the present invention, and a vehicle driving device.

A drive source control device according to the first embodiment of the present invention and a vehicle provided with the drive source control device will be described with reference to FIG. 1 to FIG. 9. FIG. 1 is a block diagram showing the conceptual configuration of a vehicle (electric vehicle) provided with the drive source control device and a vehicle driving device. This vehicle is a rear wheel drive type, and includes a chassis 60, drive wheels 61L, 61R which are rear wheels, driven wheels 62L, 62R which are front wheels, a vehicle driving device 1, a high-order ECU 66, a drive source control device 67, a battery 63, an inverter device 64, and the like.

The vehicle driving device 1 includes first and second electric motors 2L, 2R and a power transmission device 3. The first and second electric motors 2L, 2R are two drive sources that are mounted to the vehicle and can be controlled independently of each other. The power transmission device 3 is provided between the first and second electric motors 2L, 2R and the drive wheels 61L, 61R. In the present disclosure, the terms "first" and "second" do not indicate an order but are merely used for discrimination. Also, the terms "left" and "right" are irrelevant to superiority/inferiority and are merely used for discrimination.

<Basic Configuration of Control System>

The high-order ECU 66 is a high-order control device for the drive source control device 67, and for example, has a function of performing integrated control and cooperative control for the entire vehicle, and a function of generating braking/driving torque command values for the left and right drive wheels 61L, 61R. The high-order ECU 66 generates braking/driving torque command values (command values for outputs) for left and right, on the basis of an acceleration command outputted from an acceleration manipulation unit (not shown), a deceleration command outputted from a brake manipulation unit (not shown), and a turning command outputted from a steering angle sensor or the like (not shown).

The drive source control device 67 gives motor torque command values to the inverter device 64 on the basis of the braking/driving torque command values for left and right supplied from the high-order ECU 66. Thus, the first and second electric motors 2L, 2R are controlled independently of each other. The inverter device 64 converts DC power of the battery 63 to AC power for driving the first and second electric motors 2L, 2R. The inverter device 64 controls a current supplied from the battery 63 and drives the first and second electric motors 2L, 2R so that torques developed by the first and second electric motors 2L, 2R are equal to the motor torque command values. The outputs from the vehicle driving device 1 are transmitted to the left and right drive wheels 61L, 61R via respective constant-velocity joints. It is noted that the drive source control device 67 is, for example, configured from a processor such as a microcomputer, and a memory, or from a hardware module such as ASIC. In the case where the drive source control device 67 is configured from a processor and a memory, the processor may execute an algorithm, i.e., a procedure, of each module of the drive source control device 67, which is stored in the memory.

<Vehicle Driving Device 1>

<<First and Second Electric Motors 2L, 2R>>

Figure 2:
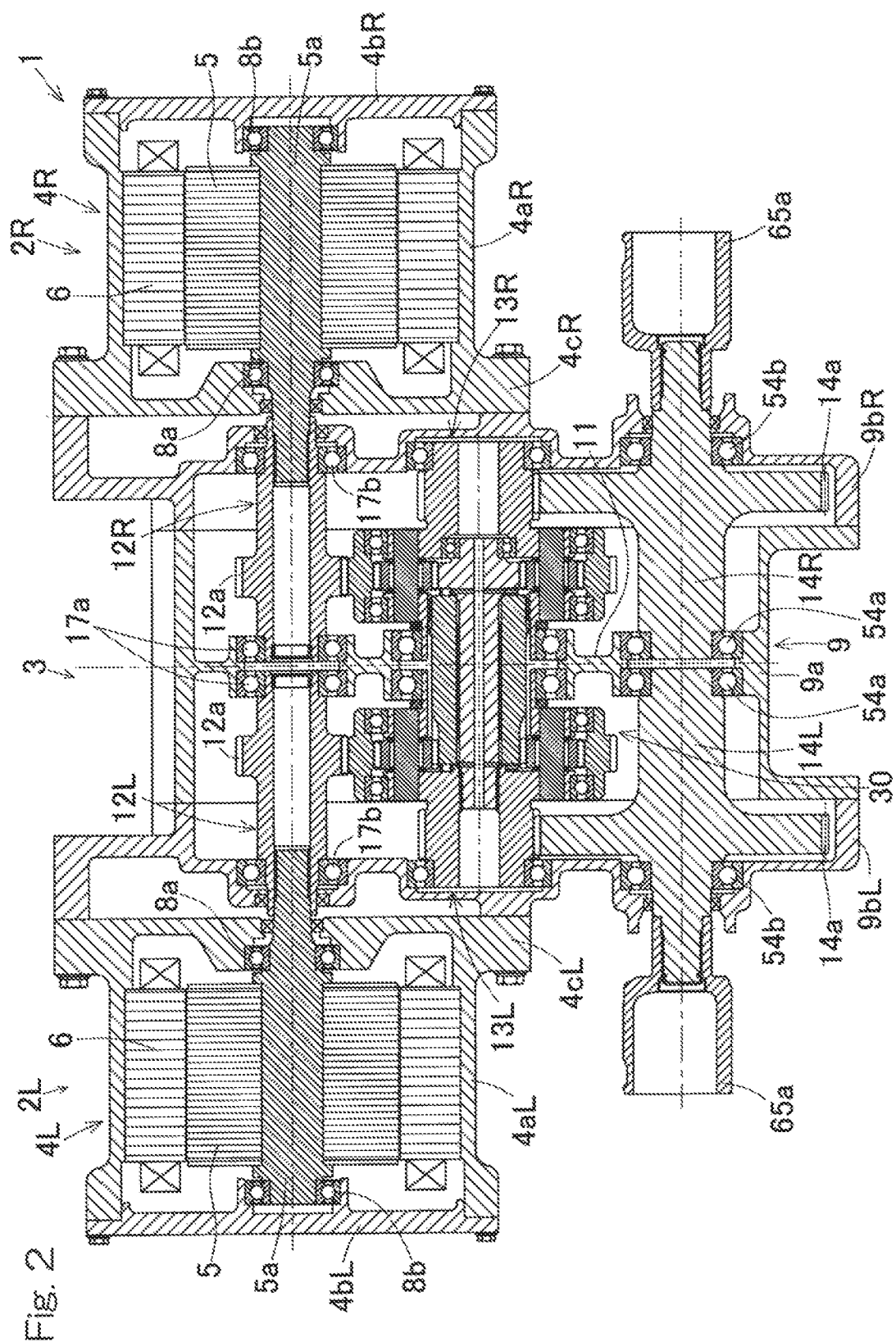
FIG. 2 is a sectional view of the vehicle driving device shown in FIG. 1.

In the present embodiment, the first and second electric motors 2L, 2R in the vehicle driving device 1 are electric motors having the same maximum output and based on the same standard. As shown in FIG. 2, the first and second electric motors 2L, 2R have motor housings 4L, 4R, stators 6, 6, and rotors 5, 5, respectively. The first and second electric motors 2L, 2R are a radial gap type in which the stators 6, 6 are provided on the inner circumferential surfaces of the motor housings 4L, 4R, and the rotor 5 is provided on the inner circumference of each stator 6 with a gap therebetween.

The motor housings 4L, 4R have cylindrical motor housing bodies 4aL, 4aR, outer side walls 4bL, 4bR, and inner side walls 4cL, 4cR, respectively. The outer side walls 4bL, 4bR close the outer side surfaces on the outboard side of the motor housing bodies 4aL, 4aR. The inner side walls 4cL, 4cR are provided on the inner side surfaces on the inboard side of the motor housing bodies 4aL, 4aR, and form separation walls for separation from the power transmission device 3. The inner side walls 4cL, 4cR have openings through which motor shafts 5a are led out to the inboard side. As used herein, in a state where the vehicle driving device 1 is mounted to the vehicle, a side outward in the vehicle width direction of the vehicle is referred to as outboard side, and a side toward the center in the vehicle width direction of the vehicle is referred to as inboard side.

The stators 6, 6 are fitted and fixed to the inner circumferential surfaces of the motor housing bodies 4aL, 4aR, respectively. Each rotor 5 has the motor shaft 5a at the center part. The inner side walls 4cL, 4cR are each provided with a rolling bearing 8a, and the outer side walls 4bL, 4bR are also each provided with a rolling bearing 8b. The motor shafts 5a are rotatably supported by the motor housings 4L, 4R via the rolling bearings 8a, 8b, respectively. The left and right motor shafts 5a, 5a are provided on the same axis (coaxially).

<<Power Transmission Device 3>>

The power transmission device 3 has a power transmission device housing 9. Further, the power transmission device 3 has two left and right input gear shafts 12L, 12R, two left and right intermediate gear shafts 13L, 13R, two left and right output gear shafts 14L, 14R, and a torque difference amplification device 30. The power transmission device 3 amplifies a difference between torques (driving torques) inputted from the motor shafts 5a of the first and second electric motors 2L, 2R by the torque difference amplification device 30, and transmits the resultant torques to the drive wheels 61L, 61R (FIG. 1).

The power transmission device housing 9 houses the above gear shafts and the torque difference amplification device 30. The power transmission device housing 9 has such a three-piece structure as to be divided into three pieces in a direction perpendicular to the axial direction of the gear shafts. Specifically, the power transmission device housing 9 has a center housing 9a and left and right lateral housings 9bL, 9bR fixed to respective side surfaces of the center housing 9a.

The side surfaces on the outboard side of the lateral housings 9bL, 9bR, and the inner side walls 4cL, 4cR, are fixed to each other by a plurality of bolts. Thus, the two electric motors 2L, 2R are fixed to both left and right ends of the power transmission device housing 9. The center housing 9a is provided with a partition wall 11 at the center. The power transmission device housing 9 is divided into two chambers at the left and the right by the partition wall 11, and these parts house a body portion of the power transmission device 3. The body portion of the power transmission device 3 is symmetric between the left and the right, and includes the input gear shafts 12L, 12R, the intermediate gear shafts 13L, 13R, the output gear shafts 14L, 14R, and the torque difference amplification device 30.

Each of the input gear shafts 12L, 12R have input gears 12a to which a power is transmitted from the corresponding motor shaft 5a. Rolling bearings 17a are provided in bearing fitting holes formed in the partition wall 11, and rolling bearings 17b are provided in bearing fitting holes formed in the left and right lateral housings 9bL, 9bR. Both ends of each input gear shaft 12L, 12R are rotatably supported by the power transmission device housing 9 via the rolling bearings 17a, 17b. The input gear shafts 12L, 12R have a hollow structure. The inboard-side ends of the motor shafts 5a are inserted into the hollow inner parts of the input gear shafts 12L, 12R. The input gear shafts 12L, 12R and the motor shafts 5a are spline-coupled with each other ("serration" coupling is also included; also for spline coupling below, "serration" coupling is included).

Figure 3:
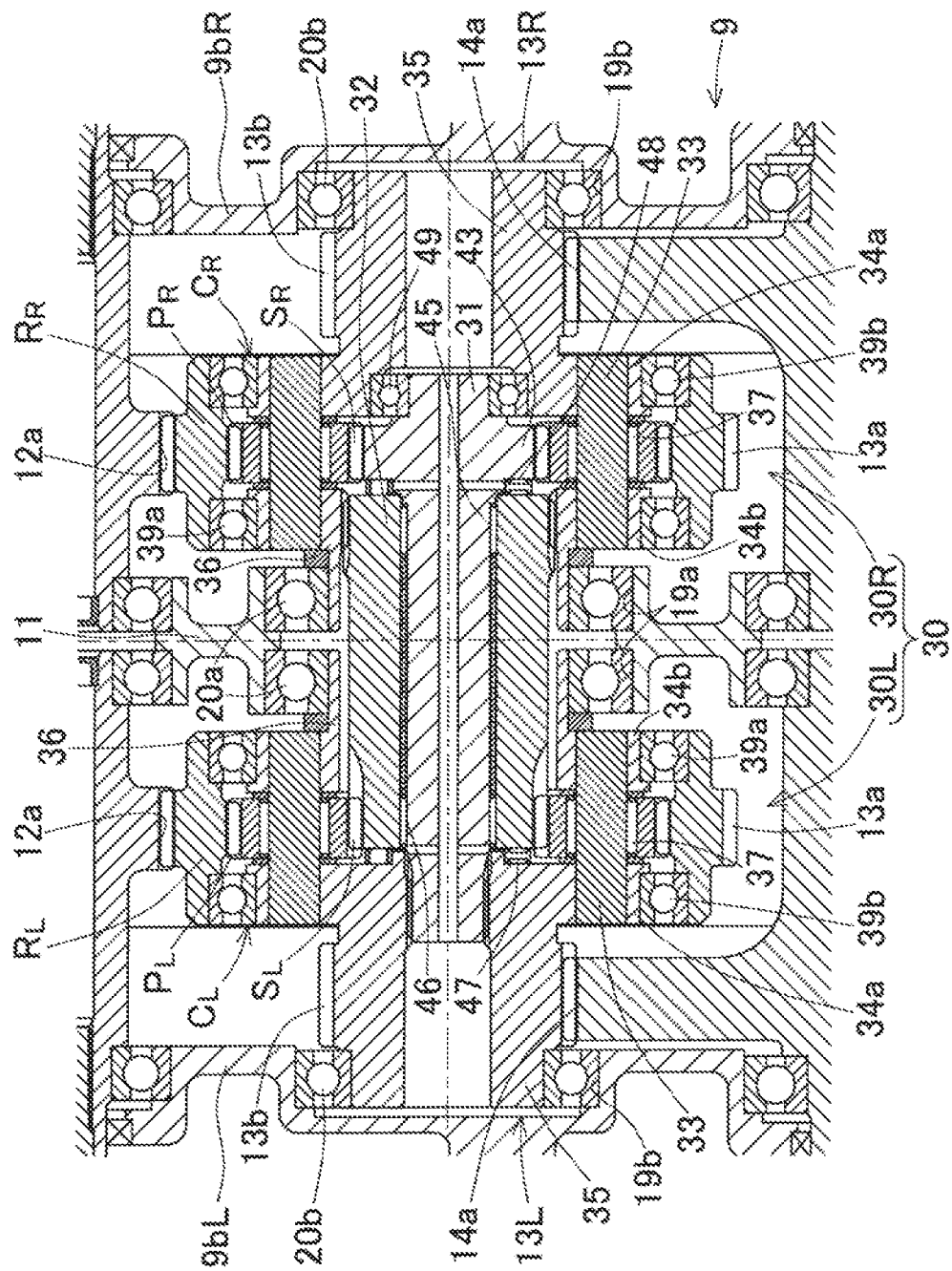
FIG. 3 is an enlarged sectional view showing a torque difference amplification device part of the vehicle driving device shown in FIG. 1.

As shown in FIG. 3, the left and right intermediate gear shafts 13L, 13R are arranged coaxially. The intermediate gear shafts 13L, 13R have input-side external gears 13a, 13a which are engaged with the input gears 12a, 12a and have a large diameter, and output-side small-diameter gears 13b, 13b which are engaged with output gears 14a, 14a described later. Rolling bearings 20a are provided in bearing fitting holes 19a formed in the partition wall 11, and rolling bearings 20b are provided in bearing fitting holes 19b formed in the left and right lateral housings 9bL, 9bR. Both ends of each intermediate gear shaft 13L, 13R are rotatably supported by the power transmission device housing 9 via the rolling bearings 20a, 20b. The bearing fitting holes 19a, 19b have stepped shapes on which outer ring end surfaces of the rolling bearings 20a, 20b abut, and penetrate so that first and second connection members 31, 32 described later pass therethrough.

To the intermediate gear shafts 13L, 13R, the torque difference amplification device 30 is assembled coaxially with the intermediate gear shafts 13L, 13R. The torque difference amplification device 30 amplifies a difference between torques (driving torques) supplied from the two electric motors 2L, 2R (FIG. 2). The torque difference amplification device 30 has two planetary gear mechanisms 30L, 30R each having three elements and two degrees of freedom. For the planetary gear mechanisms 30L, 30R, in this example, a single-pinion planetary gear mechanism is employed. The two planetary gear mechanisms 30L, 30R are provided coaxially.

The planetary gear mechanisms 30L, 30R have ring gears $R_L$, $R_R$, sun gears $S_L$, $S_R$, planetary gears $P_L$, $P_R$, and planetary carriers $C_L$, $C_R$, respectively. Further, the planetary gear mechanisms 30L, 30R have the first and second connection members 31, 32 shared therebetween. The ring gears $R_L$, $R_R$ are internal gears assembled into the input-side external gears 13a, 13a of the intermediate gear shafts 13L, 13R, respectively. The sun gears $S_L$, $S_R$ are sun gears provided coaxially with the ring gears $R_L$, $R_R$. The planetary gears $P_L$, $P_R$ are revolution gears engaged with the respective ring gears $R_L$, $R_R$ and the respective sun gears $S_L$, $S_R$. The planetary carriers $C_L$, $C_R$ are connected to the planetary gears $P_L$, $P_R$ and provided coaxially with the ring gears $R_L$, $R_R$, respectively. The output-side small-diameter gears 13b, 13b of the intermediate gear shafts 13L, 13R are connected to the planetary carriers $C_L$, $C_R$, respectively.

The first connection member 31 couples the left planetary carrier $C_L$ which is a constituent member of the planetary gear mechanism 30L at the left in the drawing in FIG. 3, and the right sun gear $S_R$ which is a constituent member of the planetary gear mechanism 30R at the right in the drawing in FIG. 3. The second connection member 32 couples the left sun gear $S_L$ which is a constituent member of the planetary gear mechanism 30L at the left in the drawing in FIG. 3, and the other planetary carrier $C_R$ which is a constituent member of the planetary gear mechanism 30R at the right in the drawing in FIG. 3.

The planetary carriers $C_L$, $C_R$ have carrier pins 33, 33 supporting the planetary gears $P_L$, $P_R$, carrier flanges 34a, 34a on the outboard side, and carrier flanges 34b, 34b on the inboard side, respectively. The planetary gears $P_L$, $P_R$ are supported by the carrier pins 33, 33 via needle roller bearings 37, 37, respectively. The carrier flanges 34a, 34a on the outboard side are connected to the outboard-side end portions of the carrier pins 33, 33, respectively. The carrier flanges 34b, 34b on the inboard side are connected to the inboard-side end portions of the carrier pins 33, 33, respectively.

The carrier flanges 34a, 34a on the outboard side have hollow shaft portions 35, 35 extending toward the outboard side, respectively. The outboard-side ends of the hollow shaft portions 35, 35 are supported via the rolling bearings 20b, 20b by the bearing fitting holes 19b, 19b formed in the lateral housings 9bL, 9bR, respectively. The carrier flanges 34b, 34b on the inboard side have hollow shaft portions 36, 36 extending toward the inboard side. The inboard-side ends of the hollow shaft portions 36, 36 are supported via the rolling bearings 20a, 20a by the bearing fitting holes 19a, 19a formed in the partition wall 11, respectively. The rolling bearings 39a, 39b are provided between the ring gear $R_L$ and the outer circumferential surfaces of the carrier flanges 34a, 34b of the planetary gear mechanism 30L at the left in the drawing, and between the ring gear $R_R$ and the outer circumferential surfaces of the carrier flanges 34a, 34b of the planetary gear mechanism 30R at the right in the drawing.

The first and second connection members 31, 32 connecting the two planetary gear mechanisms 30L, 30R to each other are provided so as to penetrate the partition wall 11 which partitions the center housing 9a (FIG. 2) into the left and right chambers. The first and second connection members 31, 32 are located coaxially with each other, and are rotatably supported in the axial direction by a thrust bearing 47 and rotatably supported in the radial direction by a deep groove ball bearing 49. Further, besides the bearings 47, 49, additional bearings 45, 46 and a thrust bearing 48 are provided between the first and second connection members 31, 32. Each of the additional bearings 45, 46 is a needle roller bearing. The second connection member 32 has a hollow shaft, and the first connection member 31 has a shaft to be inserted into the hollow shaft.

The outer circumferential surface on the outboard side at the right in the drawing in FIG. 3, of the second connection member 32, and the hollow shaft portion 36 of the carrier flange 34b on the inboard side, of the planetary carrier $C_R$, have splines to be engaged with each other. Thus, the second connection member 32 is connected to the planetary carrier $C_R$ by spline fitting. Accordingly, the planetary carrier $C_R$ which is a second rotary member rotates integrally with the second connection member 32.

The outer circumferential surface on the outboard side at the left in the drawing in FIG. 3, of the first connection member 31, and the hollow shaft portion 35 of the carrier flange 34a on the outboard side, of the planetary carrier $C_L$, have splines to be engaged with each other. Thus, the first connection member 31 is connected to the planetary carrier $C_L$ by spline fitting. Accordingly, the planetary carrier $C_L$ which is a first rotary member rotates integrally with the first connection member 31.

As described above, the first and second connection members 31, 32 are respectively connected to the planetary carriers $C_L$, $C_R$ by spline fitting. Therefore, the two planetary gear mechanisms 30L, 30R can be divided to the left and the right, and can be assembled into the three-piece-structure power transmission device housing 9 from the left and the right, together with another speed reducing gear shaft. The end portion on the planetary carrier $C_L$ side of the second connection member 32 has, on the outer circumferential surface thereof, an external gear forming the sun gear $S_L$ of the planetary gear mechanism 30L at the left in the drawing in FIG. 3. The external gear forming the sun gear $S_L$ is engaged with the planetary gear $P_L$.

The first connection member 31 has a large-diameter portion 43 at an end on the planetary gear mechanism 30R side at the right in the drawing in FIG. 3. The outer circumferential surface of the large-diameter portion 43 has an external gear forming the sun gear $S_R$ of the planetary gear mechanism 30R at the right in the drawing in FIG. 3. The external gear forming the sun gear $S_R$ is engaged with the planetary gear $P_R$. The thrust bearings 47, 48 are provided at both ends in the axial direction of the second connection member 32. By these thrust bearings 47, 48, axial-direction movements of sliding of the spline fitting parts between the first and second connection members 31, 32 and the planetary carriers $C_L$, $C_R$ are restricted, respectively. An end portion at the right in the drawing in FIG. 3, of the first connection member 31, is supported by the deep groove ball bearing 49 with respect to the planetary carrier $C_R$. The first connection member 31 has an oil hole at the axis thereof.

As shown in FIG. 2, the output gear shafts 14L, 14R have large-diameter output gears 14a, 14a, respectively. Rolling bearings 54a, 54a are provided in bearing fitting holes formed in the partition wall 11, and rolling bearings 54b, 54b are provided in bearing fitting holes formed in the left and right lateral housings 9bL, 9bR, respectively. The output gear shafts 14L, 14R are each rotatably supported by the power transmission device housing 9 via the rolling bearings 54a, 54b.

The outboard-side ends of the output gear shafts 14L, 14R are led out to the outside of the power transmission device housing 9 through openings formed in the lateral housings 9bL, 9bR, respectively. Outer joint portions of constant-velocity joints 65a are spline-coupled with the outer circumferential surfaces at the outboard-side ends of the output gear shafts 14L, 14R that are led out. The constant-velocity joints 65a are connected to the respective drive wheels 61L, 61R (FIG. 1) via intermediate shafts and the like (not shown).

Figure 4:
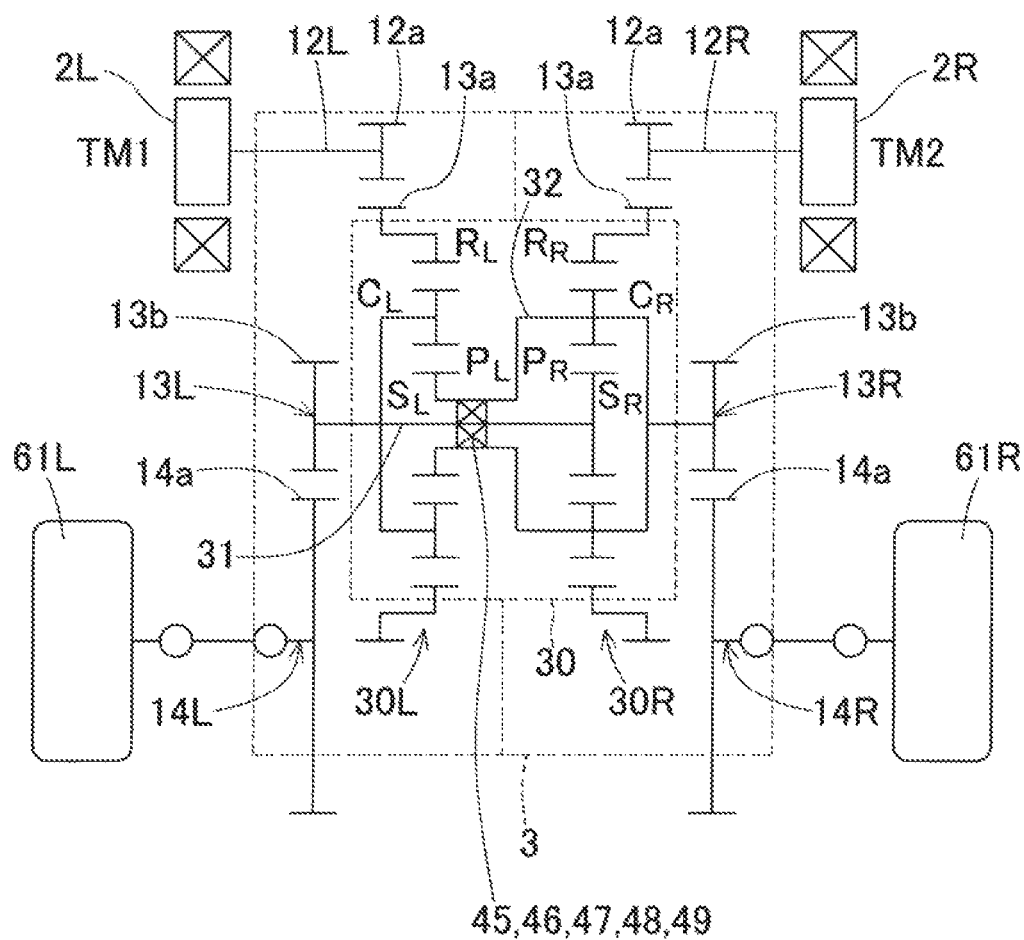
FIG. 4 is a skeleton diagram showing the vehicle driving device shown in FIG. 1.
Figure 5:
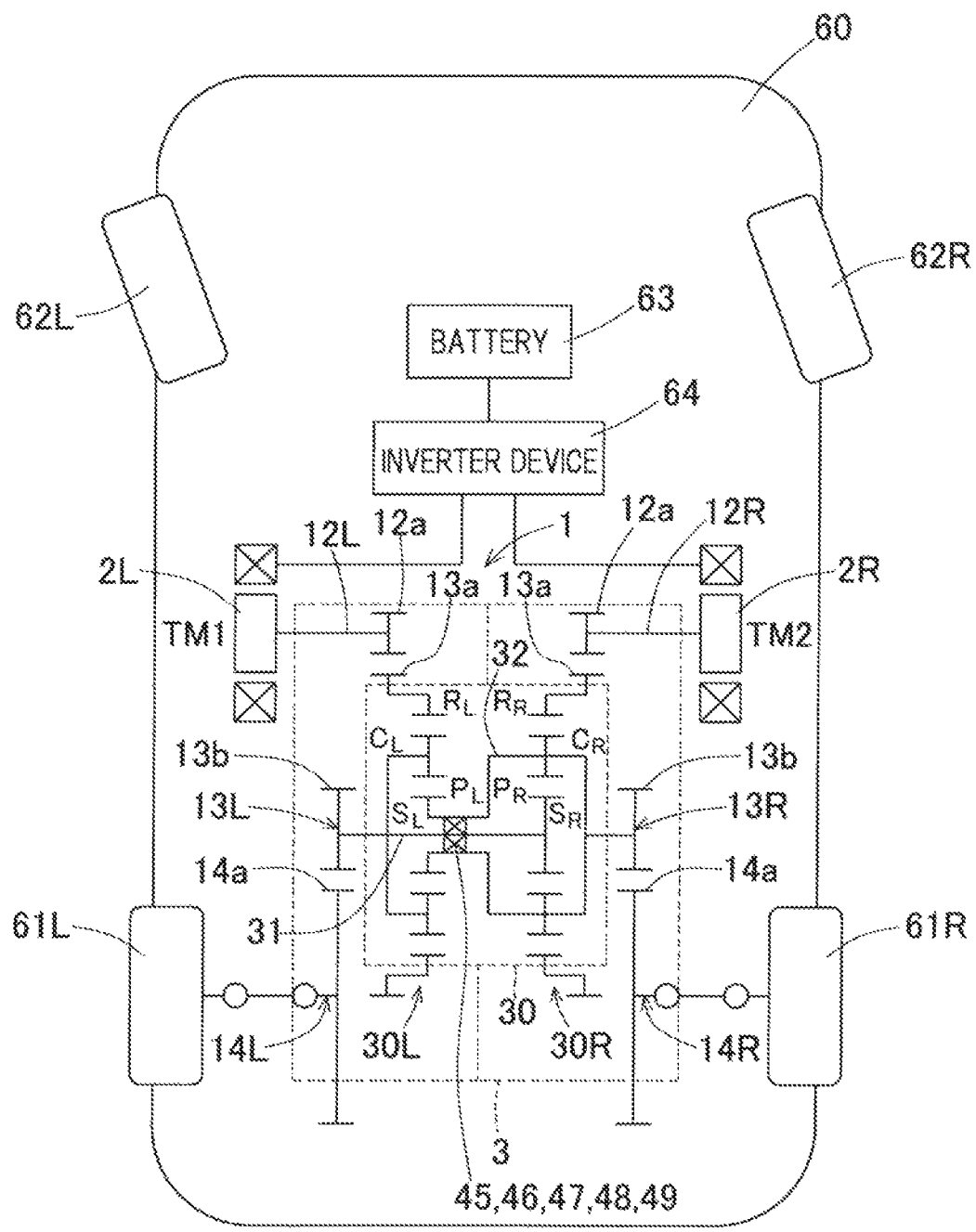
FIG. 5 illustrates an electric vehicle to which the vehicle driving device shown in FIG. 1 is mounted.

FIG. 4 is a skeleton diagram showing the vehicle driving device. FIG. 5 illustrates an electric vehicle to which the vehicle driving device is mounted. As shown in FIG. 4 and FIG. 5, the left and right electric motors 2L, 2R are individually controlled by the drive source control device 67 (FIG. 1), and thus can generate and output different torques.

The torques of the electric motors 2L, 2R are respectively amplified in accordance with the gear ratios between the input gear 12a, 12a of the input gear shafts 12L, 12R and the large-diameter input-side external gears 13a, 13a of the intermediate gear shafts 13L, 13R in the power transmission device 3, and then transmitted to the ring gears $R_L$, $R_R$ of the torque difference amplification device 30. Then, the torque difference between the left and the right is amplified by the torque difference amplification device 30, and the resultant torques are transmitted to the output-side small-diameter gears 13b, 13b. Then, the torques are further amplified in accordance with the gear ratios between the output-side small-diameter gears 13b, 13b and the output gears 14a, 14a, respectively, and the resultant torques are outputted to the drive wheels 61L, 61R.

The planetary gear mechanisms 30L, 30R of the torque difference amplification device 30 respectively include: the sun gears $S_L$, $S_R$ and the ring gears $R_L$, $R_R$, which are provided coaxially; the planetary gears $P_L$, $P_R$ located between the sun gears $S_L$, $S_R$ and the ring gears $R_L$, $R_R$; and the planetary carriers $C_L$, $C_R$ which rotatably support the planetary gears $P_L$, $P_R$ and are provided coaxially with the sun gears $S_L$, $S_R$ and the ring gears $R_L$, $R_R$. Here, the sun gears $S_L$, $S_R$ and the planetary gears $P_L$, $P_R$ are external-tooth gears having gear teeth on the outer circumferences, and the ring gears $R_L$, $R_R$ are internal-tooth gears having gear teeth on the inner circumferences. The planetary gears $P_L$, $P_R$ are engaged with the sun gears $S_L$, $S_R$ and the ring gears $R_L$, $R_R$, respectively.

In the planetary gear mechanisms 30L, 30R, when the planetary carriers $C_L$, $C_R$ are fixed, the sun gears $S_L$, $S_R$ and the ring gears $R_L$, $R_R$ rotate in directions opposite to each other, respectively. Therefore, on the velocity diagrams shown in FIG. 6, the ring gears $R_L$, $R_R$ and the sun gears $S_L$, $S_R$ are depicted on opposite sides with respect to the planetary carriers $C_L$, $C_R$.

As shown in FIG. 4 and FIG. 5, the torque difference amplification device 30 is configured such that the left planetary gear mechanism 30L including the sun gear $S_L$, the planetary carrier $C_L$, the planetary gear $P_L$, and the ring gear $R_L$, and the right planetary gear mechanism 30R including the sun gear $S_R$, the planetary carrier $C_R$, the planetary gear $P_R$, and the ring gear $R_R$, are assembled together on a common axis, as described above.

The first connection member 31 is formed to couple the planetary carrier $C_L$ which is a constituent member of the left planetary gear mechanism 30L, and the sun gear $S_R$ which is a constituent member of the right planetary gear mechanism 30R. The second connection member 32 is formed to couple the sun gear $S_L$ which is a constituent member of the left planetary gear mechanism 30L, and the planetary carrier $C_R$ which is a constituent member of the right planetary gear mechanism 30R.

A torque TM1 generated by the left electric motor 2L is transmitted from the input gear shaft 12L to the intermediate gear shaft 13L. Then, while the torque difference between the left and the right is amplified by the torque difference amplification device 30, the torque transmitted to the intermediate gear shaft 13L is sequentially transmitted via the left planetary gear mechanism 30L to the output-side small-diameter gear 13b and the output gear 14a of the intermediate gear shaft 13L, and then the output gear shaft 14L. Then, a driving torque TL (FIG. 6) is outputted from the output gear shaft 14L to the drive wheel 61L.

A torque TM2 generated by the right electric motor 2R is transmitted from the input gear shaft 12R to the intermediate gear shaft 13R. Then, while the torque difference between the left and the right is amplified by the torque difference amplification device 30, the torque transmitted to the intermediate gear shaft 13R is sequentially transmitted via the right planetary gear mechanism 30R to the output-side small-diameter gear 13b and the output gear 14a of the intermediate gear shaft 13R, and then the output gear shaft 14R. Then, a driving torque TR (FIG. 6) is outputted from the output gear shaft 14R to the drive wheel 61R.

<Driving Torques, Etc.>

Figure 6:
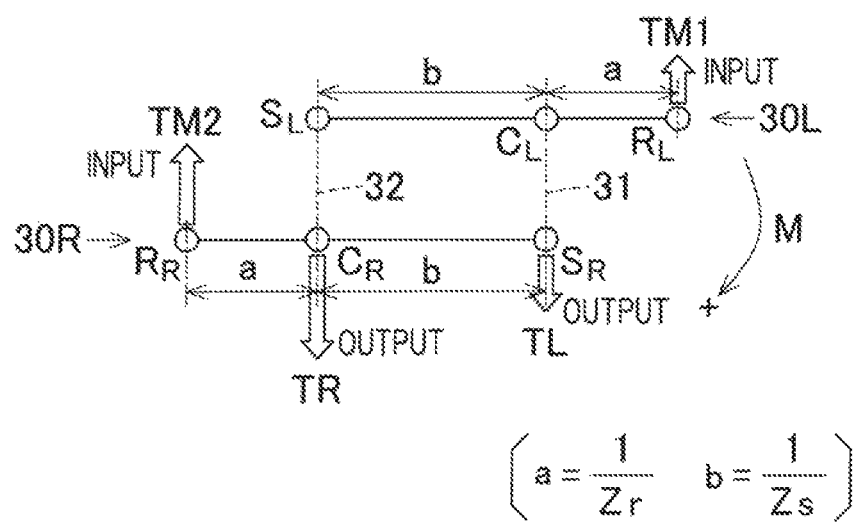
FIG. 6 shows velocity diagrams for illustrating a torque difference amplification factor of the vehicle driving device shown in FIG. 1.

Here, driving torques transmitted by the torque difference amplification device 30 will be described with reference to the velocity diagrams shown in FIG. 6. Since the torque difference amplification device 30 is formed from the assembly of the two identical single-pinion planetary gear mechanisms 30L, 30R, the torque difference amplification device 30 can be expressed by two velocity diagrams as shown in FIG. 6. Here, for facilitating the understanding, the two velocity diagrams are shifted upward and downward, so that the upper side in the drawing in FIG. 6 shows the velocity diagram of the left planetary gear mechanism 30L, and the lower side in the drawing in FIG. 6 shows the velocity diagram of the right planetary gear mechanism 30R.

In practice, as shown in FIG. 5, the torques TM1 and TM2 outputted from the respective electric motors 2L, 2R are respectively inputted to the ring gears $R_L$, $R_R$ via the input-side external gears 13a, 13a engaged with the input gears 12a, 12a of the input gear shafts 12L, 12R, and thus the magnitudes of the torques TM1 and TM2 are changed in accordance with the reduction ratios. In addition, the driving torques TL, TR outputted from the torque difference amplification device 30 are respectively transmitted to the left and right drive wheels 61L, 61R via the output-side small-diameter gears 13b, 13b engaged with the output gears 14a, 14a, and thus the magnitudes of the driving torques TL, TR are changed in accordance with the reduction ratios.

Although the torques are changed in accordance with the above reduction ratios in this vehicle driving device, hereinafter, for facilitating the understanding, as shown in FIG. 6, it is assumed that the reduction ratios are 1, and thus the torques inputted to the ring gears $R_L$, $R_R$ remain TM1, TM2, and the driving torques remain TL, TR, in the description of the velocity diagrams and calculation expressions.

In the two single-pinion planetary gear mechanisms 30L, 30R, gear elements having an identical number of teeth are used. Therefore, in the velocity diagrams, the distance between the ring gear $R_L$ and the planetary carrier $C_L$ is equal to the distance between the ring gear $R_R$ and the planetary carrier $C_R$. This distance is defined as "a". In addition, the distance between the sun gear $S_L$ and the planetary carrier $C_L$ is equal to the distance between the sun gear $S_R$ and the planetary carrier $C_R$. This distance is defined as "b".

The ratio between the length from the respective planetary carriers $C_L$, $C_R$ to the ring gears $R_L$, $R_R$ is equal to the ratio between a reciprocal (1/Zr) of a number Zr of teeth of the ring gear $R_L$, $R_R$. The ratio between the length from the respective planetary carriers $C_L$, $C_R$ to the sun gears $S_L$, $S_R$ is equal to the ratio between a reciprocal (1/Zs) of a number Zs of teeth of the sun gear $S_L$, $S_R$. Therefore, a=(1/Zr) and b=(1/Zs) are satisfied.

From balance of a moment M with a point of $R_R$ as a reference, the following expression (9) is satisfied. In FIG. 6, an arrow direction M in the drawing is the positive direction of the moment.

$$a*TR+(a+b)*TL-(b+2a)*TM1=0 \tag{9}$$

From balance of a moment M with a point of $R_L$ as a reference, the following expression (10) is satisfied.

$$a*TL+(a+b)*TR+(b+2a)*TM2=0 \tag{10}$$

From expression (9)+expression (10), the following expression (11) is obtained.

$$-b*(TR-TL)+(2a+b)*(TM2-TM1)=0$$

$$(TR-TL)=((2a+b)/b)*(TM2-TM1) \tag{11}$$

In expression (11), (2a+b)/b represents a torque difference amplification factor α. By substituting a=1/Zr and b=1/Zs, α=(Zr+2Zs)/Zr is obtained. That is, the following torque difference amplification factor α is obtained.

$$\alpha = (Zr + 2Zs)/Zr$$

In this example, the torques from the electric motors 2L, 2R (FIG. 5) are inputted to the ring gears $R_L$, $R_R$, respectively, and the torques to the drive wheels 61L, 61R (FIG. 5) are outputted from the sun gears and the planetary carriers, i.e., $S_R+C_L$ and $S_L+C_R$, respectively.

As shown in FIG. 5 and FIG. 6, in the case where a difference between the rotation speeds of the first connection member 31 and the second connection member 32 is small, if different torques TM1, TM2 are generated from the two electric motors 2L, 2R so as to supply an input torque difference ΔTIN (=(TM1−TM2)), the input torque difference ΔTIN is amplified in the torque difference amplification device 30, whereby a driving torque difference α*ΔTIN greater than the input torque difference ΔTIN can be obtained.

That is, even if the input torque difference ΔTIN is small, the input torque difference ΔTIN can be amplified with the torque difference amplification factor α (=(Zr+2Zs)/Zr) by the torque difference amplification device 30. Thus, a driving torque difference ΔTOUT (=α*(TM2−TM1)) greater than the input torque difference ΔTIN can be supplied between the driving torques TL, TR transmitted to the left drive wheel 61L and the right drive wheel 61R.

As shown in FIG. 1, the rotation angular velocities of the left and right electric motors 2L, 2R also depend on the rotation angular velocities of the left and right drive wheels 61L, 61R and the numbers of teeth of the gears included in the power transmission device 3. It is noted that the numbers of teeth of the gears included in the power transmission device 3 are the numbers of teeth of the gears of the input gear shafts 12L, 12R, the intermediate gear shafts 13L, 13R, the output gear shafts 14L, 14R, and the torque difference amplification device 30 as shown in FIG. 2. Hereinafter, the "numbers of teeth of the gears included in the power transmission device 3" are simply referred to as "numbers of teeth of gears".

If the rotation speeds of the left and right electric motors 2L, 2R in FIG. 1 are respectively defined as ωM1, ωM2, and the rotation speeds of the left and right drive wheels 61L, 61R are respectively defined as ωWL, ωWR, the following relational expressions are satisfied.

$$\omega M1 = A1*\omega WL - A2*\omega WR \quad (12)$$

$$\omega M2 = -B1*\omega WL + B2*\omega WR \quad (13)$$

Here, A1, A2, B1, and B2 are constants determined by the numbers of teeth of gears, and they are all positive values. Rotating one of the left and right drive wheels 61L, 61R causes rotations of the two electric motors 2L, 2R. In other words, both of the two electric motors 2L, 2R are to be rotated in order to rotate one drive wheel 61L (61R).

Figure 7:
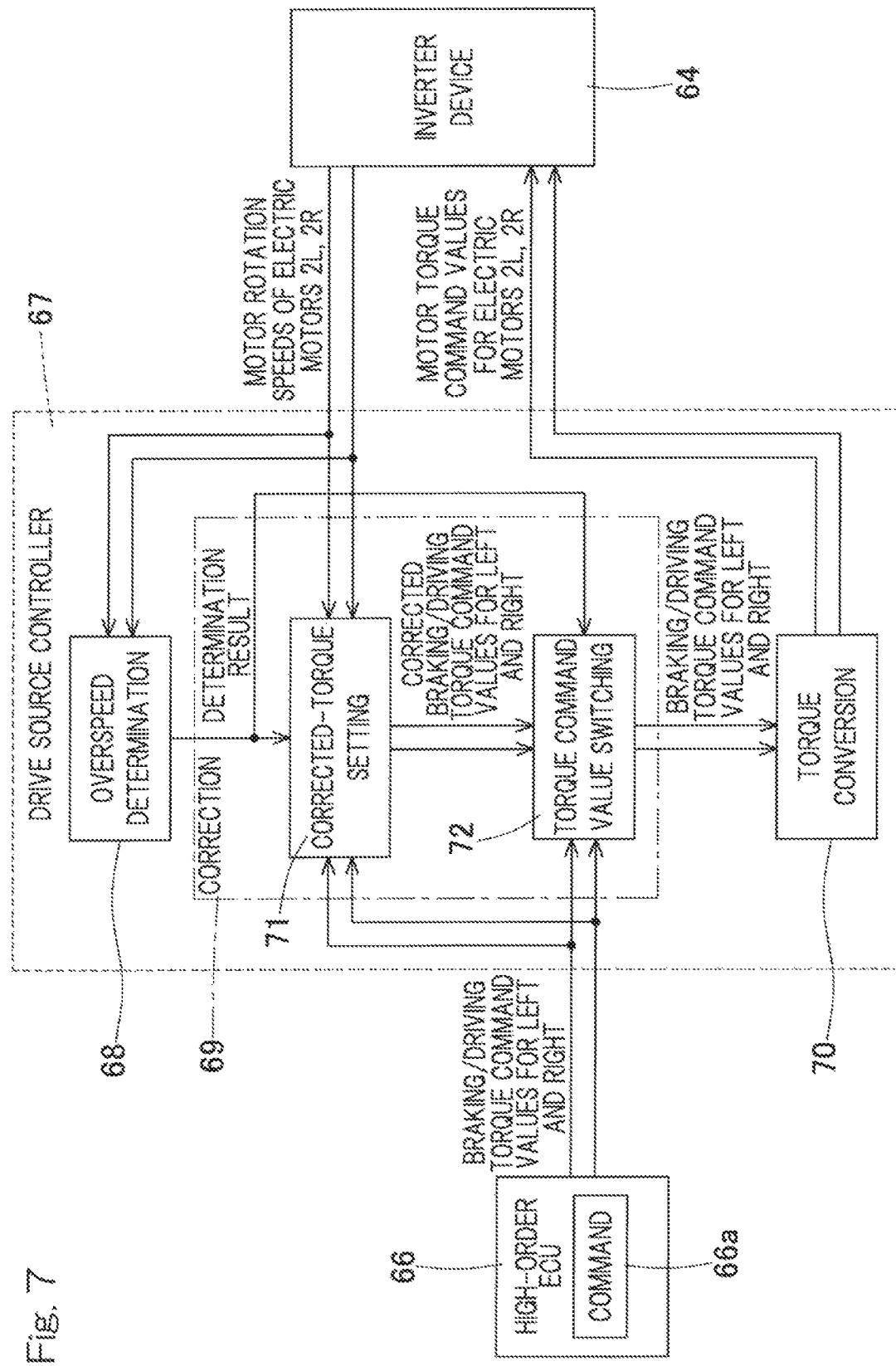
FIG. 7 is a block diagram of a control system of the drive source control device shown in FIG. 1.

FIG. 7 is a block diagram of a control system of the drive source control device 67.

As shown in FIG. 1 and FIG. 7, in the drive source control device 67, detecting and suppressing overspeed of electric motor 2L, 2R are processed on the basis of the motor rotation speeds of the left and right electric motors 2L, 2R, received from the inverter device 64. The inverter device 64 controls a current supplied from the battery 63 in accordance with the motor rotation speeds so that torques developed by the electric motors 2L, 2R become equal to the respective motor torque command values, thereby driving the electric motors 2L, 2R. The motor rotation speeds are respectively detected by rotation detection devices such as resolvers each provided to the corresponding electric motor 2L or 2R, for example.

The drive source control device 67 receives the braking/driving torque command values TL, TR for the respective left and right drive wheels 61L, 61R from a command module 66a of the high-order ECU 66, and receives the motor rotation speeds ωM1, ωM2 of the electric motors 2L, 2R from the inverter device 64. The drive source control device 67 includes an overspeed determination module 68, a correction module 69, and a torque conversion module 70. The overspeed determination module 68 determines whether or not each of the left electric motor 2L and the right electric motor 2R has reached overspeed. Specifically, the overspeed determination module 68 compares each of the motor rotation speeds ωM1, ωM2 received from the inverter device 64, with a preset threshold value. If the motor rotation speed ωM1 of the left electric motor 2L is greater than the threshold value, the overspeed determination module 68 determines that the left electric motor 2L has reached overspeed. If the motor rotation speed ωM2 of the right electric motor 2R is greater than the threshold value, the overspeed determination module 68 determines that the right electric motor 2L has reached overspeed. Then, the overspeed determination module 68 outputs a result of the determination as to whether or not at least one electric motor has reached overspeed.

The correction module 69 includes a corrected-torque setting module 71 and a torque command value switching module 72. The corrected-torque setting module 71 receives braking/driving torque command values for left and right from the command module 66a of the high-order ECU 66, the motor rotation speeds ωM1, ωM2 from the inverter device 64, and a result of the determination by the overspeed determination module 68. The corrected-torque setting module 71 sets corrected braking/driving torque command values for left and right so that the torque of the drive wheel 61L (61R) that has the greater rotation speed, of the left and right drive wheels 61L, 61R, becomes smaller than the value before the correction, or becomes a braking torque, and the torque of the drive wheel 61R (61L) having the smaller rotation speed becomes equal to or smaller than the value before the correction.

The rotation speeds of the left and right drive wheels 61L, 61R may be calculated from the motor rotation speeds, for example. Alternatively, the rotation speeds of the left and right drive wheels 61L, 61R may be detected by rotation sensors (not shown) respectively provided to the drive wheels 61L, 61R. By setting the braking/driving torque command values for left and right to the corrected braking/driving torque command values for left and right as described above, the braking/driving torques of the two electric motors 2L, 2R are substantially corrected.

In accordance with a result of the determination by the overspeed determination module 68, in a normal case, the torque command value switching module 72 outputs the braking/driving torque command values received from the high-order ECU 66 to the torque conversion module 70 without change, and in the case where overspeed has occurred in at least one of the left electric motor 2L and the right electric motor 2R, the torque command value switching module 72 outputs the corrected braking/driving torque command values. The torque conversion module 70 converts the braking/driving torque command values received from the high-order ECU 66, or the corrected braking/ driving torque command values, to motor torque command values so as to be outputted to the inverter device 64.

Figure 8:
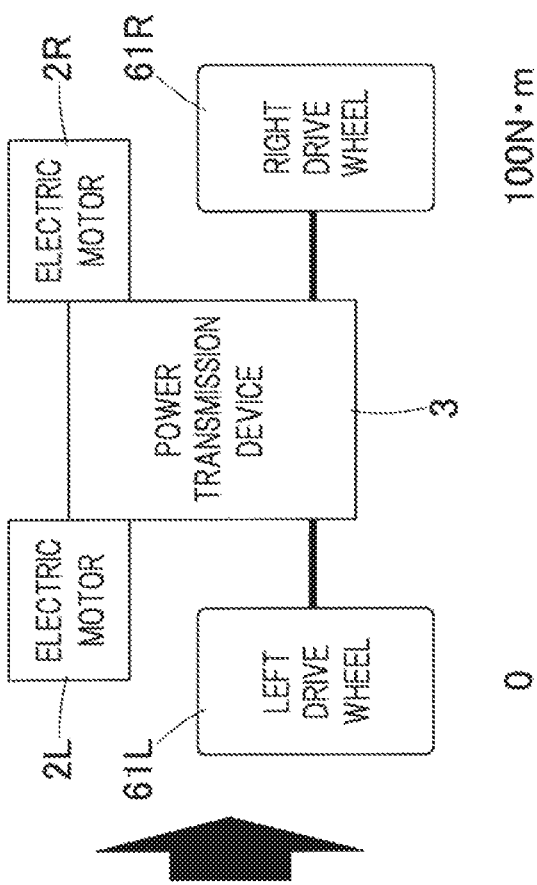
FIG. 8 is a diagram showing an example of torque command values corrected by the drive source control device shown in FIG. 1.
Figure 8:
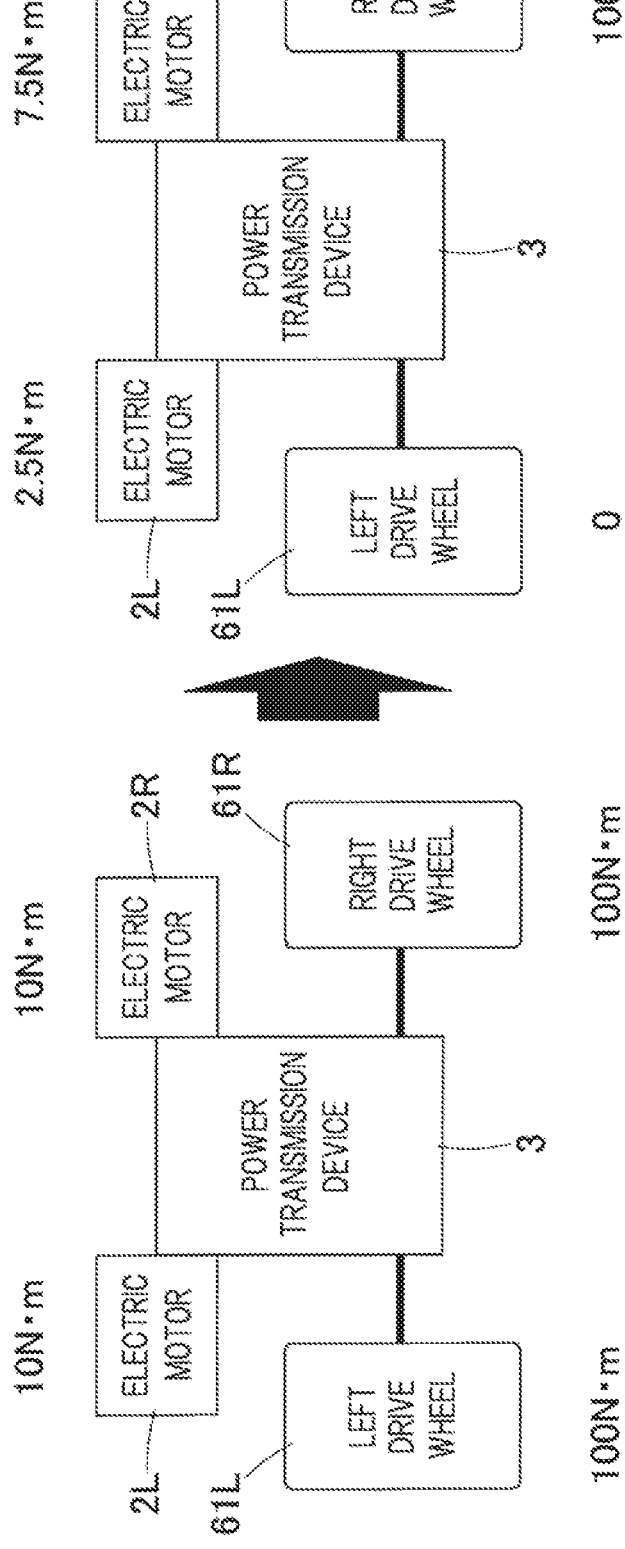

FIG. 8 shows an example of the torque command values before correction and the corrected torque command values. In the following description, FIG. 1 and FIG. 7 are also referred to, as necessary. In this example, it is assumed that the torque difference amplification factor α is 2, and the reduction ratio β is 10. Before correction, as shown in diagram (a) of FIG. 8, the motor torque command values are 10 N·m, and the braking/driving torque command values for the left and right drive wheels 61L, 61R are both 100 N·m. If overspeed occurs in the left drive wheel 61L, the electric motor 2L reaches overspeed. The overspeed determination module 68 then determines that the left electric motor 2L has reached overspeed, and outputs the determination result.

As shown in diagram (b) of FIG. 8, the corrected-torque setting module 71 sets corrected braking/driving torque command values so that the braking/driving torque command value for the left drive wheel 61L becomes zero and the braking/driving torque command value for the right drive wheel 61R is maintained at 100 N·m. By performing setting as described above, the left drive wheel 61L decelerates by being subjected to mechanical resistance from the road surface and the driving part, and as a result, overspeed of the electric motor 2L is suppressed. The set motor torque command values for the electric motor 2L and the electric motor 2R, i.e., the corrected braking/driving torque command values, are 2.5 N·m and 7.5 N·m, respectively. In this way, the motor torque command values for the electric motors 2L, 2R are corrected.

FIG. 9 shows another example of the torque command values before correction and the corrected torque command values. In this example, it is also assumed that the torque difference amplification factor α is 2, and the reduction ratio β is 10. Before the correction, as shown in diagram (a) of FIG. 9, the motor torque command values are 10 N·m, and the braking/driving torque command values for the left and right drive wheels 61L, 61R are both 100 N·m. If overspeed occurs in the left drive wheel 61L, the overspeed determination module 68 determines that the left electric motor 2L has reached overspeed, and outputs the determination result.

As shown in diagram (b) of FIG. 9, the corrected-torque setting module 71 sets corrected braking/driving torque command values so that the braking/driving torque command value for the left drive wheel 61L becomes −100 N·m (that is, a braking torque occurs in the left drive wheel 61L), and the braking/driving torque command value for the right drive wheel 61R is maintained at 100 N·m. By performing setting as described above, a braking torque occurs in the left drive wheel 61L in response to the electric motor 2L, in addition to mechanical resistance from the road surface and the driving part. Therefore, it is possible to suppress overspeed of the electric motor 2L more effectively than in the example shown in FIG. 8. Further, the drive source control device 67 may control a friction brake (not shown) provided to the drive wheel 61L, thereby reducing the motor rotation speed of the electric motor 2L. In the example in diagram (b) of FIG. 9, the motor torque command values for the electric motors 2L, 2R are adjusted to −5 N·m and 5 N·m, respectively, through correction. In this way, the motor torque command values for the electric motors 2L, 2R are corrected.

The torque to be corrected of the drive wheel that has the greater rotation speed may be determined by, for example, performing feedback control so that the rotation speed becomes equal to or smaller than a reference wheel rotation speed. Where the rotation speed of the wheel is defined as w, the reference wheel rotation speed is defined as $\omega_{target}$, a difference between the rotation speed ω of the wheel and the reference wheel rotation speed $\omega_{target}$ is defined as Δω, the braking/driving torque command value from the high-order ECU 66 (FIG. 7) is defined as T, and the corrected braking/driving torque command value is defined as T', the braking/driving torque command value can be corrected by using expressions (14) and (15).

$$\Delta\omega=\omega-\omega_{target} \quad (14)$$

$$T'=T-\{K_P{*}\Delta\omega+K_I{*}\textstyle\int(\Delta\omega)dt+K_D{*}d/dt(\Delta\omega)\} \quad (15)$$

Here, $K_P$, $K_I$ and $K_D$ are control gains. The reference wheel rotation speed $\omega_{target}$ may be set on the basis of the wheel rotation speed of a driven wheel of the vehicle or the drive wheel that has the smaller rotation speed. Alternatively, the reference wheel rotation speed $\omega_{target}$ may be set on the basis of the rotation speed of the overspeed drive wheel at the time when overspeed is detected from this drive wheel.

In the drive source control device 67 as described above, the corrected-torque setting module 71 sets corrected braking/driving torque command values for left and right so that the torque of the drive wheel 61L (61R) that has the greater rotation speed, of the left and right drive wheels 61L, 61R, becomes smaller than the value before correction, or becomes a braking torque, and the torque of the drive wheel 61R (61L) that has the smaller rotation speed becomes equal to or smaller than the value before correction. In accordance with a result of the determination by the overspeed determination module 68, in a normal case, the torque command value switching module 72 outputs the braking/driving torque command values received from the high-order ECU 66, to the torque conversion module 70, and in the case where overspeed has occurred in the left electric motor 2L or the right electric motor 2R, the torque command value switching module 72 outputs the corrected braking/driving torque command values. The torque conversion module 70 converts the braking/driving torque command values received from the high-order ECU 66, or the corrected braking/driving torque command values, to motor torque command values so as to be outputted to the inverter device 64.

Correcting the command values for outputs of the two electric motors 2L, 2R as described above enables the drive wheel 61L (61R) that has the greater rotation speed to decelerate by being subjected to mechanical resistance from the road surface and the driving part. As a result, overspeed of the electric motor 2L (2R) is suppressed. In addition to this, occurrence of an unnecessary yaw moment due to increase in torque is suppressed in the corresponding drive wheel 61L (61R), whereby the vehicle attitude can be stabilized.

In the case where the correction module 69 corrects the command values for outputs of the two electric motors 2L, 2R so that the torque of the drive wheel 61L (61R) that has the greater rotation speed, of the left and right drive wheels 61L, 61R, becomes a braking torque and the torque of the drive wheel 61R (61L) that has the smaller rotation speed becomes equal to or smaller than the value before correction, a braking torque occurs in the drive wheel 61L (61R) that has the greater rotation speed, in response to the electric motor 2L (2R), in addition to mechanical resistance from the road surface and the driving part. Therefore, it is possible to suppress overspeed of the electric motor 2L (2R) more effectively.

Modifications of the first embodiment will be described.

In the following description, when only part of the configuration is described, the other part of the configuration is the same as that previously described, unless otherwise specified. The same operations and effects are obtained from the same configuration. Not only parts specifically described in each embodiment can be combined, but also the embodiments can be partially combined with each other unless such a combination does not particularly cause a problem.

In FIG. 8 and FIG. 9, the braking/driving torque command value for the right drive wheel 61R after correction is maintained at the braking/driving torque command value before correction. However, another method may be employed. For example, when overspeed is detected in the left drive wheel 61L, the corrected-torque setting module 71 may decrease the braking/driving torque command value for the right drive wheel 61R in accordance with the amount of decrease in the braking/driving torque command value for the left drive wheel 61L.

In addition, for example, if a large difference between a measured yaw rate of the vehicle and a reference or normative yaw rate (yaw rate calculated under the assumption that there is no reduction in the torque of the left drive wheel) calculated from a predetermined vehicle model is determined, the drive source control device 67 may determine a significant fluctuation of the vehicle attitude. Then, in order to suppress the fluctuation of the vehicle attitude, the drive source control device 67 may reduce the torque of the right drive wheel 61R in accordance with the magnitude of a deviation between the measured yaw rate and the calculated normative or reference yaw rate.

As another example, the drive source control device 67 may calculate a sideslip angle or a sideslip angular velocity on the basis of the measured vehicle speed, lateral acceleration, and yaw rate of the vehicle. The drive source control device 67 determines a significant fluctuation of the vehicle attitude, if a large difference from a normative sideslip angle or a normative sideslip angular velocity (sideslip angle or sideslip angular velocity calculated under the assumption that there is no reduction in the torque of the left drive wheel) calculated from a predetermined vehicle model, is determined. Then, in order to suppress the fluctuation of the vehicle attitude, the drive source control device 67 may reduce the torque of the right drive wheel 61R in accordance with the magnitude of a deviation between the calculated normative sideslip angle and the sideslip angle calculated from the measured vehicle speed and the like, or the magnitude of a deviation between the calculated normative sideslip angular velocity and the sideslip angular velocity calculated from the measured vehicle speed and the like.

The above embodiment has shown the example in which the overspeed determination module 68 of the drive source control device 67 determines whether or not the electric motor 2L, 2R has reached overspeed, on the basis of the motor rotation speed inputted from the inverter device 64. However, the drive source control device 67 according to the present invention is not limited thereto. That is, the drive source control device 67 may receive output values from ABS sensors or pulsar rings which detect the rotation speeds of the left and right drive wheels 61L, 61R, and the overspeed determination module 68 may determine whether or not the electric motor 2L, 2R has reached overspeed, on the basis of the output values. Specifically, since the relationships represented by expressions (12) and (13) described above are satisfied between the rotation speeds of the electric motors 2L, 2R and the left and right drive wheels 61L, 61R, the overspeed determination module 69 may calculate the rotation speeds of the electric motors 2L, 2R using these expressions, and compare each rotation speed with a predetermined threshold value, to determine whether or not the electric motor 2L, 2R has reached overspeed.

Without using the above expressions (12) and (13), the overspeed determination module 68 may determine whether or not the electric motor 2L, 2R has reached overspeed, when the rotation speeds of the left and right drive wheels 61L, 61R satisfy a predetermined condition. The predetermined condition is determined through examination and/or simulation, for example.

By correcting the torques of the left electric motor 2L and the right electric motor 2R as described above, it is possible to reduce the rotation speed of the electric motor in which overspeed has occurred, e.g., the left electric motor 2L, and further, by preventing increase in the torque of the right drive wheel, occurrence of an unnecessary yaw moment due to motor torque correction is suppressed and thus the vehicle attitude can be stabilized.

In the embodiment shown in FIG. 2 and FIG. 3, the first connection member 31 is formed to couple the planetary carrier $C_L$ of the left planetary gear mechanism 30L, and the sun gear $S_R$ of the right planetary gear mechanism 30R, and the second connection member 32 is formed to couple the sun gear $S_L$ of the left planetary gear mechanism 30L and the planetary carrier $C_R$ of the right planetary gear mechanism 30R. However, the configuration is not limited to this example.

For example, the first connection member 31 may be formed to couple the sun gear $S_L$ of the left planetary gear mechanism 30L and the ring gear $R_R$ of the right planetary gear mechanism 30R, and the second connection member 32 may be formed to couple the ring gear $R_L$ of the left planetary gear mechanism 30L and the sun gear $S_R$ of the right planetary gear mechanism 30R.

Furthermore, the second connection member 32 may be formed to couple the planetary carrier $C_L$ of the left planetary gear mechanism 30L and the ring gear $R_R$ of the right planetary gear mechanism 30R.

The drive sources of the vehicle driving device are not limited to electric motors, but may be an internal combustion engine such as a gasoline engine.

The bearings 45, 46 between the first and second connection members 31, 32 may be bearings other than needle roller bearings. For example, rolling bearings such as deep groove ball bearings or angular contact ball bearings may be used.

Although the present invention has been described above in connection with the preferred embodiments with reference to the accompanying drawings, numerous additions, modifications, or deletions can be made without departing from the gist of the present invention. Accordingly, such additions, modifications, or deletions are to be construed as included in the scope of the present invention.

REFERENCE NUMERALS 2L, 2R . . . electric motor (drive source)
3 . . . power transmission device
61L, 61R . . . drive wheel
66a . . . command module
67 . . . drive source control device
68 . . . overspeed determination module
69 . . . correction module

What is claimed is:

1. A drive source control device for controlling two drive sources of a vehicle, the vehicle including the two drive sources, left and right drive wheels, and a power transmission device disposed among the two drive sources and the left and right drive wheels, the power transmission device being configured to distribute powers from the two drive sources to the left and right drive wheels while amplifying a difference between the torques from the two respective drive sources, so as to drive the left and right drive wheels, the drive source control device comprising:

an overspeed determination module configured to determine whether or not a rotation speed of each of the two drive sources is overspeed; and a correction module configured to, when the overspeed determination module determines that the rotation speed of at least one of the two drive sources is overspeed, correct command values for outputs of the two respective drive sources, the command values being supplied from a command module, the correction module correcting the command values for the outputs of the two respective drive sources so that a torque of the drive wheel that has the greater rotation speed, of the left and right drive wheels, decreases from the torque before the correction, and a torque of the drive wheel that has the smaller rotation speed maintains or decreases from the torque before the correction.

2. The drive source control device as claimed in claim 1, wherein the correction module configured to correct the command values for the outputs of the two respective drive sources so that the torque of the drive wheel that has the greater rotation speed, of the left and right drive wheels, becomes a braking torque, and the torque of the drive wheel that has the smaller rotation speed maintains or decreases from the torque before the correction.

3. The drive source control device as claimed in claim 1, wherein the power transmission device includes a torque difference amplification device, the torque difference amplification device having two planetary gear mechanisms, the torque difference amplification device amplifying a difference between torques generated by the two drive sources.

4. The vehicle comprising the drive source control device as claimed in claim 1.

* * * * *